(12) United States Patent
Leydier et al.

(10) Patent No.: US 6,343,364 B1
(45) Date of Patent: Jan. 29, 2002

(54) METHOD AND DEVICE FOR LOCAL CLOCK GENERATION USING UNIVERSAL SERIAL BUS DOWNSTREAM RECEIVED SIGNALS DP AND DM

(75) Inventors: Robert A. Leydier, La Londe les Maures (FR); Alain C. Pomet, Austin, TX (US)

(73) Assignees: Schlumberger Malco Inc., Owings Mills, MD (US); STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/614,736

(22) Filed: Jul. 13, 2000

(51) Int. Cl.[7] .................................................. G06F 1/04
(52) U.S. Cl. ........................................ 713/500; 713/503
(58) Field of Search .............................. 713/400, 500, 713/501, 502, 503

(56) References Cited

U.S. PATENT DOCUMENTS 5,077,529 A * 12/1991 Ghoshal et al. ............. 327/152
5,487,084 A * 1/1996 Lindholm .................... 375/215
5,818,948 A * 10/1998 Gulick ........................ 381/77
6,061,802 A * 5/2000 Gulick ........................ 713/400
6,092,210 A * 7/2000 Larky et al. ................. 713/400

* cited by examiner

*Primary Examiner*—Dennis M. Butler
(74) *Attorney, Agent, or Firm*—Taylor Russell & Russell, P.C.

(57) ABSTRACT

A method and device is disclosed for generating a local clock signal CLK1X (172) from Universal Synchronous Bus downstream-received differential signals DM and DP carrying the downstream received bit-serial signal. The method and device does not require the use of a crystal or resonator. Counters (312, 310, 305, 301) are used to determine a number of periods of a free-running high frequency clock signal (164) contained within in a known number of bit periods of the downstream received bit-serial signal (146). The counter values are divided by the known number of bit periods of the received bit-serial signal (146) to determine a bit period of the received bit-serial signal (146). The local clock signal (172) may be phase-locked with the received bit serial signal (146). The local clock period is updated on an ongoing manner by downstream known received traffic.

32 Claims, 16 Drawing Sheets

METHOD AND DEVICE FOR LOCAL CLOCK GENERATION USING UNIVERSAL SERIAL BUS DOWNSTREAM RECEIVED SIGNALS DP AND DM

BACKGROUND

The invention relates generally to Integrated Circuit (IC) cards or smart cards used in processing transactions involving goods and services. Smart cards are plastic cards having microprocessor and memory circuits attached to the front or back side that connect to electrical contacts located on a front side of the card. The circuits are activated and data accessed from the card by inserting the card into a reader device that makes connections to the electrical contacts. More particularly, the invention relates to a device and method for connecting a smart card to smart card reader devices that have different interface characteristics. Furthermore, the invention relates to a novel method and device for generating an internal clock signal that is synchronized by an externally applied signal.

Smart cards are a class of data cards. Data cards used in processing transactions are either passive or active in nature. Passive data cards include traditional credit, debit and ATM cards that make use of stored data on a magnetic strip on the back of the card. When a transaction is processed using a passive data card, transaction verification is generally required via a reader device connected to a remote computer over a telephone network. During a transaction, data may be written and read from the magnetic strip. Active data cards or smart cards make use of processor and memory circuits embedded on the card that are activated when the card is connected to a reader device. Since smart cards may contain the intelligence required to complete a transaction, the transaction may be completed locally without resorting to a telephone connection to a remote transaction verification facility. In addition to storing data related to the owner's account such as identification number and account balance, the circuits also contain encryption for security purposes. Smart cards are used in many applications, including Subscriber Identification Module (SIM) in Global System for Mobile (GSM) telephones, TV satellite receivers, banking, health care programs, parking and highway toll payment, etc. Smart cards are expected to find increasingly wider application, eventually replacing magnetic strip type data cards.

The basic smart card standard is the International Standard ISO 7816, which provides detailed requirements for the physical, electrical, mechanical, and application programming interface for IC cards with contacts. In particular, International Standard ISO 7816-1 Physical Characteristics, International Standard 7816-2 Dimension and Location of the Contacts, and International Standard ISO 7816-3 Electronic Signals and Transmission Protocols are incorporated herein by reference. This standard provides for a serial interface connection to the smart card. In a great majority of cases, these cards are used in a reader connected to a computer. The reader contains electronic circuits that enable communication between the card and the computer. The reader is connected to a computer by means of a serial or parallel port on the computer.

The Universal Serial Bus (USB) has recently become firmly established and has gained wide acceptance in the Personal Computer (PC) marketplace. The USB was developed in response to a need for a standard interface that extends the concept of "plug and play" to devices external to a PC, and enables users to install and remove external peripheral devices without having to open the PC case or to remove power from the PC. The USB provides a low-cost, half-duplex serial interface that is easy to use and readily expandable. The USB also supplies up to 500 mA of current at 5 volts to interconnected devices. The USB is currently defined by the Universal Serial Bus Specification written and controlled by USB Implementers Forum, Inc., a non-profit corporation founded by the group of companies that developed the USB Specification. In particular, Chapter 5 USB Data Flow Model, Chapter 7 Electrical, and Chapter 8 Protocol Layer of Universal Serial Bus Specification are incorporated herein by reference. The increasingly widespread use of the USB in computers has led smart card reader manufacturers to develop USB interfaces for connection of their products to computers to complement the existing serial and parallel interfaces. However, because of the differences between the serial interface defined by ISO 7816 and the serial interface defined by the USB specification, smart cards have not been directly compatible with the USB specification. And different card reader configurations have been required due to incompatibility constraints between the various computer interface standards.

The USB Specification version 1.1 defines two theoretical data transfer speed rates. A low-speed at 1.5 megabits per second and a full-speed at 12 megabits per second are provided. A high-speed data transfer rate greater than 480 megabits per second is anticipated for high data throughput application such as video or mass storage. The present invention preferably makes use of the low-speed implementation of packet transactions. When taking into account the different overheads and protocols, the effective USB low speed data rate varies between 50 kilobits per second and 400 kilobits per second depending of the available bandwidth. This data rate outperforms the data rate achieved by use of the ISO 7816 Standard. The higher data rate makes possible a reduction in smart card customizing time, and increases possible applications.

A hub provides USB attachment points. Attachment points are referred to as ports. The host has an embedded hub called the root hub that provides one or more attachment points. A USB device provides additional functionality to the host and is connected to one of the ports of any hub. The host, embedded in a PC, masters the USB. Each device reacts in a master-slave relationship. Every transaction starts by a host request. The USB does not have any dedicated clock signal lines. Each hub and each USB device has its own reference clock. The hub supports both low speed and full speed data signaling rates. The hub clock generator uses a crystal to provide the ±0.25% timing accuracy required for full speed transactions. A low speed device clock generator tolerance of ±1.5% is compatible with the use of a cheaper resonator. All USB transactions, downstream and upstream, begin with a Synchronization Pattern (SP) signal that allows the device and the hub clocks to lock in phase. Because of the lack of space and limited contact pin availability, neither a crystal nor a resonator is practical solutions for clocking USB circuitry on a smart card.

For the foregoing reasons, there is a need to provide a smart card with a capability for local clock generation using the SP and Packet Identifier (PID) signals, without the use of crystals, resonators or other components external to an integrated circuit. There is a further need to connect a smart card to an USB port without the need for any interposing electronic circuitry.

SUMMARY

The present invention is directed towards a device and method for providing a smart card with the capability of supporting the serial interface defined by the USB specification without adding any additional complexity to the smart card or reader.

The present invention is also directed towards a device and method for generating a USB device clock signal synchronized with a USB signal, without the need for a crystal or resonator. Furthermore, the present invention is also directed towards a device and method for connecting a smart card to a USB port with a simple connector without the need for any interposing electronic circuitry.

The present invention relates to a physical link between a USB port and a smart card. It describes a solution to generate a USB low speed device clock without using any external components.

When a hub sends information to an Integrated Circuit Module (ICM) on a smart card, the ICM is in a reception mode. This is referred to as a downstream transaction. When the ICM sends information to the hub, the hub is in reception mode. This is referred to as an upstream transaction. In a last communication combination, the hub and the ICM are both in a reception mode, which comprises an idle state. During data transmission, DP and DM signal lines carry differential signals such that when DP is at "1", DM is at "0" and vice versa. The voltage slew rate on DP and DM is limited to 3.6 Volt/75 ns. These two characteristics minimize radiated Electromagnetic Interference (EMI) by the device.

The passage from one transmitter to the next occurs in the following sequence. A current transmitter reports an End Of Packet (EOP) and sets the USB in the J state (DM at "1" and DP at "0") for one bit duration. The DM and DP signal lines are then caused to float, where none of the transmitters are active, and pull-down and pull-up devices define voltages on the DP and DM signal lines. When the next transmitter sets the bus in the J state for one bit duration, a new transmission starts with a new SP signal.

A host request starts with a SP followed by a PID. SP and PID transmit known bit patterns. SP signals are used in downstream and upstream transactions to lock a device or hub reception clock in phase with a transmission clock. PID signals are used in downstream and upstream transactions to identify the packet. A differential receiver whose inputs are connected to the signals DP and DM shapes an RXD signal.

The present invention uses downstream SP and PID signals sent by the hub to generate a device clock signal CLK1X with a nominal frequency of 1.5 MHz and a precision better than ±1.5% and, at the same time, to lock the device clock signal CLK1X phase with the downstream RXD signal phase.

The present invention contained within a device has a free running clock signal CLKOSC. A period of the CLKOSC signal is known within ±30%, but has stability of better than 0.1% over a short period of time (1 millisecond). The first downstream Token Packet received by a device incorporating the present invention calibrates a CLK1X signal period at better than ±1.5% using CLKOSC signal and locks the CLK1X signal in phase with the downstream received signal RXD. Once the calibrations are completed, the device incorporating the present invention can receive or send data. Every other downstream SP and PID received by a device containing the present invention starts a new calibration procedure for the device clock signal period and its phase, furthermore every other downstream data toggling signal received outside SP and PID resynchronizes the phase of the device clock signal CLK1X. This compensates for Initial inaccuracy, temperature sensitivity and long term drift of CLKOSC.

A method having features of the present invention comprises a method for generating a local clock signal in a device using Universal Serial Bus downstream signals DP and DM, comprising receiving the USB downstream differential signals DP and DM and generating a downstream bit-serial signal from the USB downstream signals, counting a number of cycles R of a free-running high frequency clock signal contained within a known number of bit periods S of the received downstream bit-serial signal, dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal, and generating a local clock signal having a period equal to the number of free-running high frequency clock cycles T. The step of generating the local clock signal may comprise counting the number of the free-running high frequency clock cycles T to generate a period of the local clock signal, and initializing the counting step when there is a data toggling in the received downstream bit serial signal for locking in phase the generated local clock with the received downstream bit serial signal. The step of generating the local clock signal may further comprise updating the period of the local clock signal when a known received downstream bit serial pattern is recognized. The known number of bit periods S of the received downstream bit-serial signal may be eight. The method may further comprise generating the free-running high frequency clock signal with a ring oscillator. The step of generating the free-running high frequency clock signal with a ring oscillator further may comprise generating an even number of signals V having a period of the free-running high frequency clock signal and the phase shifted of 360°/V. The even number of signals V may be eight. The method may be implemented in an integrated circuit module. The integrated circuit module may be positioned on a smart card. The local clock signal may be phase locked with the downstream bit serial signal at least once every seven bit periods of the downstream bit serial signal by the use of bit-stuffing. The counting step may be performed during a period of time when the downstream bit serial signal comprises a Sync byte and a PID Setup byte of a USB Token Packet and Data Packet. The known received downstream bit serial pattern may comprise a Sync byte and a PID Setup byte of a USB Token Packet and Data Packet. The method may further comprise a step for determining if T is within predefined limits. The local clock signal may be used to sample the USB received downstream serial bit data and to time the USB transmitted upstream serial bit data.

In an alternate embodiment of the invention, a device containing a circuit for generating a local clock signal using Universal Serial Bus downstream signals DP and DM, comprises means for receiving the USB downstream differential signals DP and DM and generating a downstream bit-serial signal from the USB downstream signals, means for counting a number of cycles R of a free-running high frequency clock signal contained within a known number of bit periods S of the received downstream bit-serial signal, means for dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal, and means for generating a local clock signal having a period equal to the number of free-running high frequency clock cycles T. The means for generating the local clock signal may comprise means for counting the number of the free-running high frequency clock cycles T to generate a period of the local clock signal, and means for initializing the counting step when there is a data toggling in the received downstream bit serial signal for locking in phase the generated local clock with the received downstream bit serial signal. The means for generating the local clock signal may further comprise means for updating the period of the local clock signal when a known received downstream bit serial pattern is recognized. The known number of bit periods S of the received downstream bit-serial signal may be eight. The means for generating the free-running high frequency clock signal may be a ring oscillator. The means for generating the free-running high frequency clock signal with a ring oscillator may further comprise means for generating an even number of signals V having a period of the free-running high frequency clock signal and the phase shifted of 360°/V. The even number of signals V may be eight. The circuit may be implemented in an integrated circuit module. The integrated circuit module may be positioned on a smart card. The local clock signal may be phase locked with the downstream bit serial signal at least once every seven bit periods of the downstream bit serial signal by the use of bit-stuffing. The counting means may be performed during a period of time when the downstream bit serial signal comprises a Sync byte and a PID Setup byte of a USB Token Packet and Data Packet. The known received downstream bit serial pattern may comprise a Sync byte and a PID Setup byte of a USB Token Packet and Data Packet. The circuit may further comprise a means for determining if T is within predefined limits. The local clock signal may be used to sample the USB received downstream serial bit data and to time the USB transmitted upstream serial bit data.

In another alternate embodiment of the invention, a device containing a circuit for generating a local clock signal using Universal Serial Bus downstream signals DP and DM, may comprise a differential receiver for receiving the USB downstream differential signals DP and DM and generating a downstream bit-serial signal from the USB downstream signals, a first counter connected to the bit serial signal for counting a number of cycles R of a free-running high frequency clock signal contained within a known number of bit periods S of the received downstream bit-serial signal, a divider circuit for dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal, and a second counter for generating a local clock signal having a period equal to the number of free-running high frequency clock cycles T. The second counter may be initialized by data toggling in the received downstream bit serial signal. The free-running high frequency clock signal may be generated by an eight phase ring oscillator. The first counter may be enabled during a period of time when the downstream bit serial signal comprises a Sync byte and a PID Setup byte of a USB Token Packet and Data Packet.

BRIEF DESCRIPTION OF THE DRAWINGS

These and other features, aspects, and advantages of the present invention will become understood with regard to the following description, appended claims, and accompanying drawings where:

DETAILED DESCRIPTION

Figure 1:
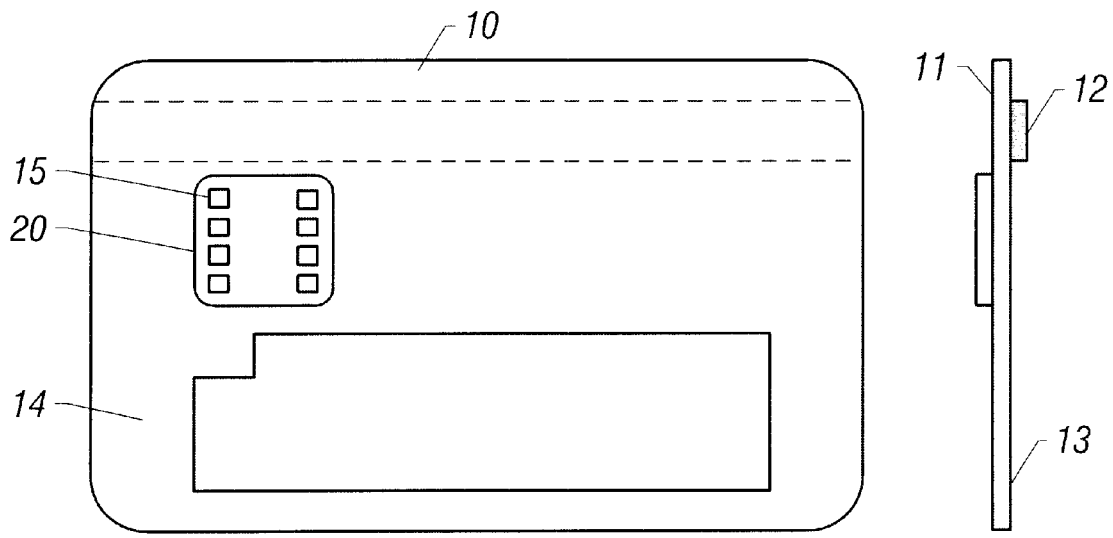
FIG. 1 shows a front view and side view of a smart card indicating the locations allowed for functional features.

Turning now to FIG. 1, FIG. 1 shows a front view and a side view of a smart card 10. The smart card 10 meets the requirements of International Standard ISO 7816. ISO 7816 requires the smart card to meet the physical characteristics of a card type ID-1 specified in International Standard ISO 7810. The card 10 is made of polyvinyl chloride, polyvinyl chloride acetate, or similar materials. The smart card 10 has a front surface 11 and a back surface 13. It may have an optional embossed area 14 on the front surface 11 and an optional magnetic strip 12 on the back surface 13. Eight electrical contacts 15 arranged in two columns of four are positioned on the front surface II of the smart card 10 for connection to an ICM 20 attached to the card 10. The contacts 15 shown are of minimum size allowed and must be positioned at the location shown on the front surface 11 of the card 10. Although the ICM 20 may be located on either the front surface 11 or the back surface 13 of the smart card 10, in the present embodiment ICM 20 is positioned on the front surface 11 of the smart card 10, as shown.

Figure 2:
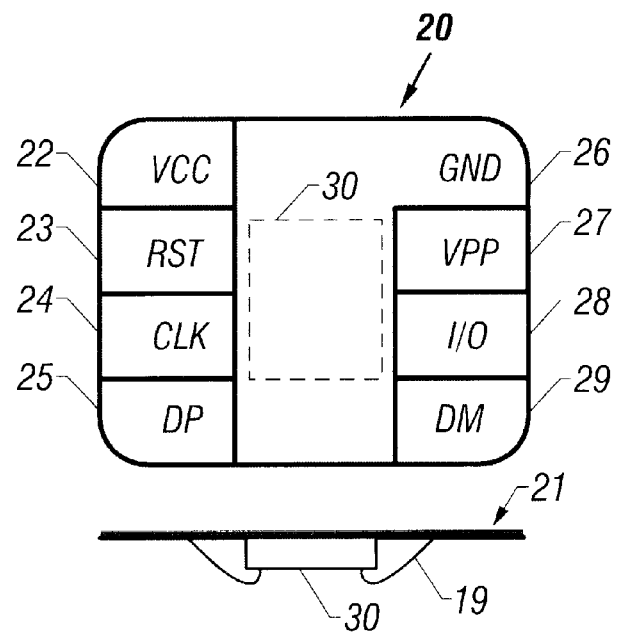
FIG. 2 shows an ICM that may be used for connecting to both ISO and USB serial interfaces.

Turning to FIG. 2, FIG. 2 shows an ICM 20 that may be used for connecting to either an ISO 7816 or a USB interface. The ICM has eight electrical contacts 22–29 positioned on a substrate 21 and an IC 30 attached to the side of the substrate 21 opposite the contacts 22–29. The electrical contacts 22–29 are electrically isolated from each other. Electrical connection between the IC and the contacts 22–29 is accomplished through the use of bonding wires 19. Electrical connections between the opposite sides of the substrate 21 may be accomplished by any means common in the art, including conductive vias. The IC 30 and the bonding wires 19 are normally encapsulated for protection from mechanical and environmental effects. The contacts 22–29 on the ICM 20 include supply voltage VCC 22, reset signal RST 23, clock signal CLK 24, driver plus DP 25, ground GND 26, variable voltage VPP 27, input/output signal I/O 28, and driver minus DM 29. ICM 20 is compatible for use in ISO and USB applications.

Figure 3:
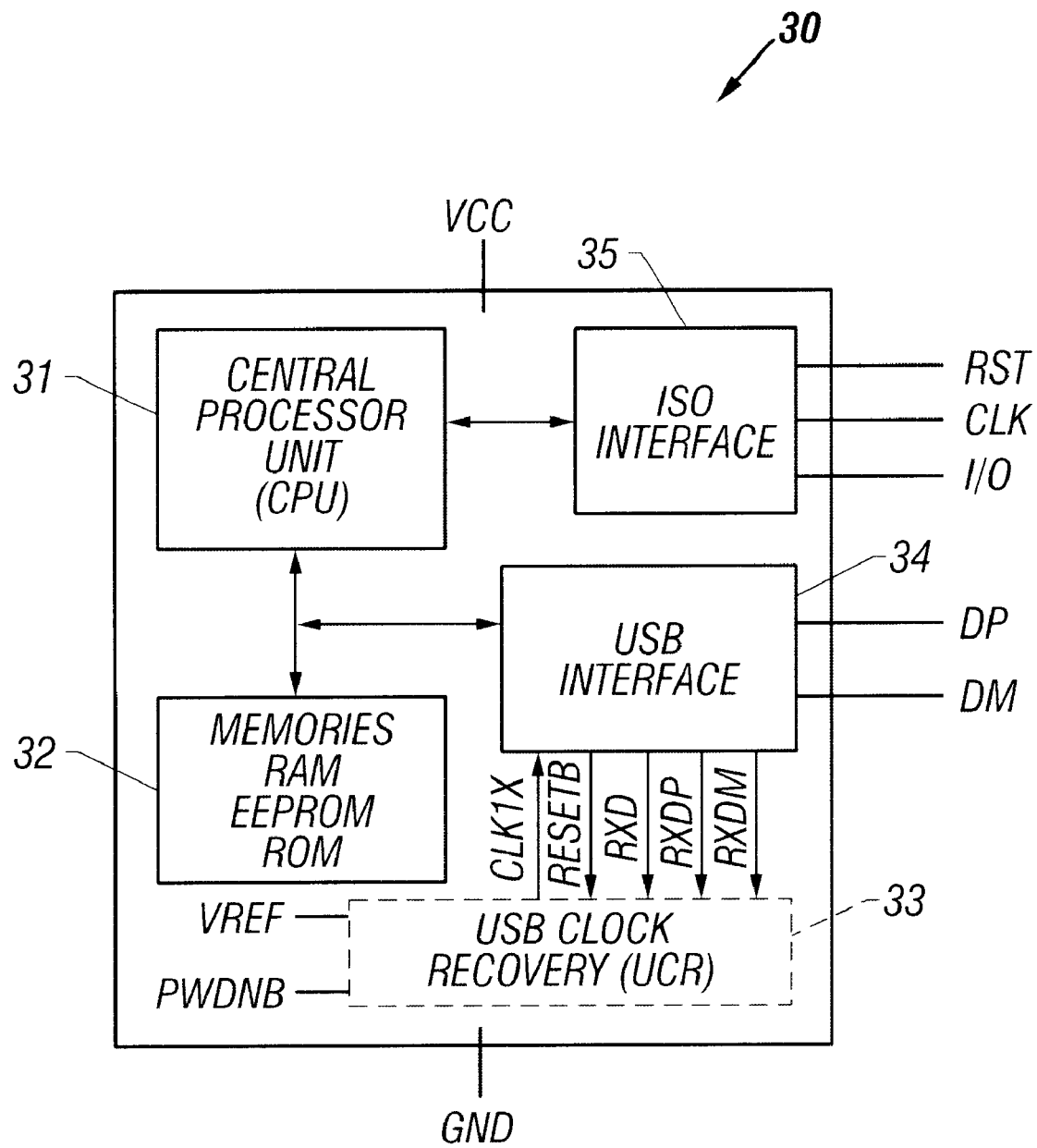
FIG. 3 shows a block diagram of the IC used in the ICM.

Turning to FIG. 3, FIG. 3 shows a block diagram of the IC 30 included in the ICM 20. This IC 30 comprises five building blocks. The Central Processor Unit (CPU) 31 executes the Operating System (OS) code stored in memories bank 32. In a particular embodiment, the ROM and EEPROM memories store permanent or temporary data while the RAM memory is storing temporary data only. Block 34 is a USB interface between DP and DM signaling on one end and data and CPU address buses on the other end. Block 35 is an ISO 7816 serial interface between RST, CLK and I/O signaling on one end and the CPU on the other end. Signals RESETB, RXD, RXDP and RXDM are delivered to the USB Clock Recovery block (UCR) 33 as well as VREF and PDWNB. The signal CLK1X feeds the USB interface 34. The UCR 33 is described in this patent application.

Figure 4:
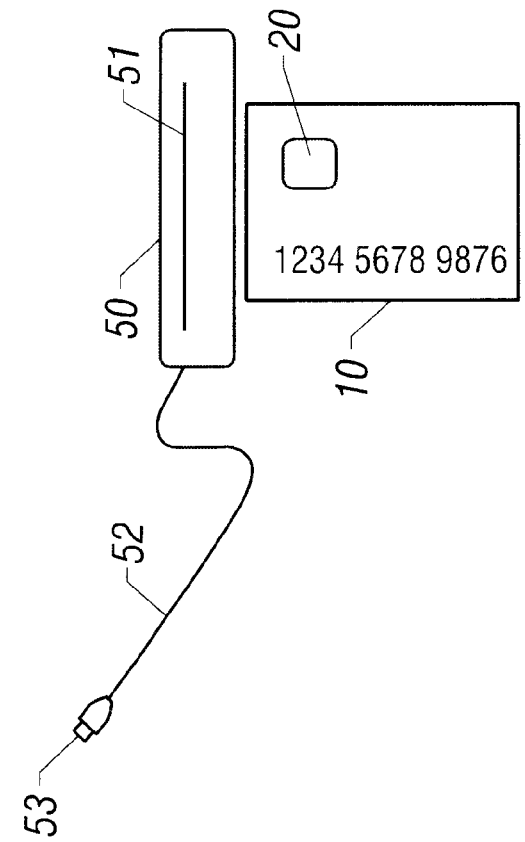
FIG. 4 shows a smart card reader, a smart card and the Host PC.
Figure 4:
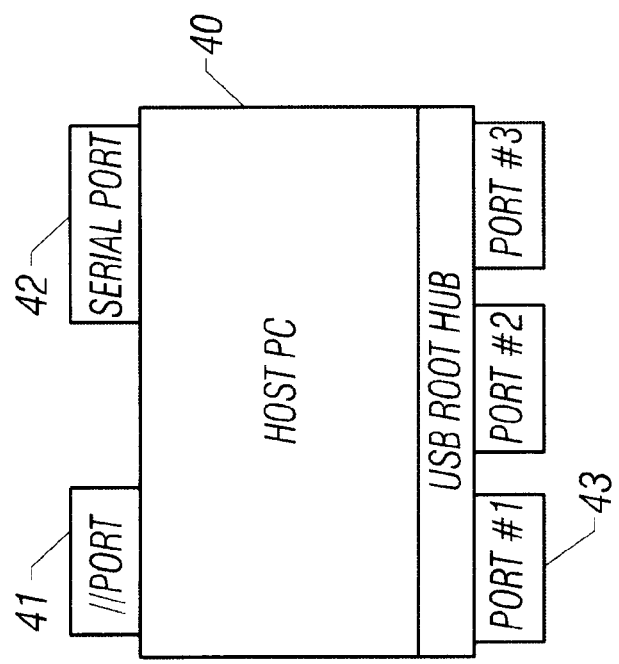

Turning now to FIG. 4, FIG. 4 shows a smart card reader 50 and a smart card 10. The smart card contains an ICM 20 as described earlier. The smart card plugs into a slot 51 in the card reader 50. The smart card reader has connecting contacts within the card reader that connect the ICM contacts to either a cable 52 and a connector 53, or to an ISO 7816 interface circuit that connects through the cable 52 to a connector 53. For an ISO style smart card reader, the connector 53 may be parallel port compatible and connects to parallel port 41 on a host PC 40, or RS232 compatible and connects to serial port 42 on a host PC. For a USB style smart card reader, the connector 53 may be USB compatible and connects to a USB Hub port 43 on a Host PC 40 or others. Active circuitry is required in the ISO style card reader. For an USB style smart card reader, the connector 53 is a USB Series A plug connector and connects to a USB Hub port 43 on a Host PC 40 equipped with a USB series A receptacle. No active circuits are required in the USB style card reader.

Figure 5:
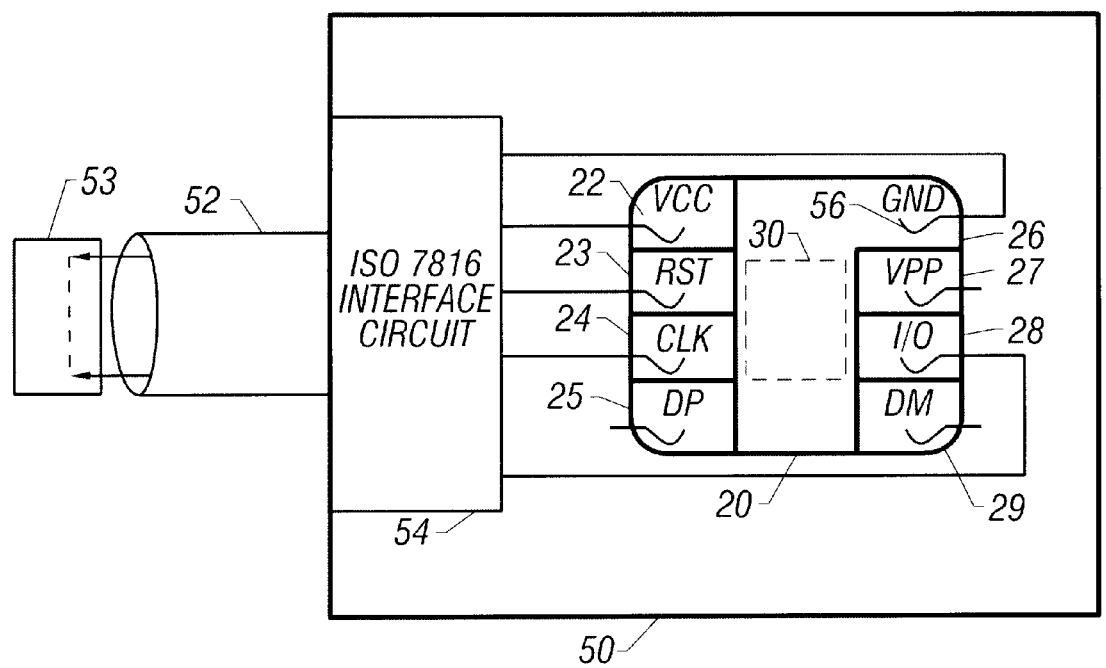
FIG. 5 shows an ISO 7816 interface connection between an ICM and an ISO style card reader.

Turning now to FIG. 5, FIG. 5 shows an ISO 7816 style smart card reader 50 having an ISO 7816 interface circuit 54 interposed between the ICM 20 and a connector 53. The ICM 20 is positioned on a smart card 10 as physically depicted in FIG. 4. Eight connector pins 56 within the smart card reader connect to the contacts 22–29 on the ICM 20. A cable 52 is connected between the ISO style card reader 50 and the terminating connector 53. The terminating connector 53 may plug into a port on a Host PC or terminal, as shown in FIG. 4. The connector 53 may be connected to, for example, a parallel port, a RS-232 serial port or a USB port. When the ICM 20 is connected to a card reader having an ISO 7816 interface circuit 54, the integrated circuit 30 on the ICM 20 operates in the ISO mode exclusively and transfers data between the module 20 and a computer or terminal via an interposing interface circuit 54. The ISO 7816 interface circuit 54 requires the use of connections to the supply voltage contact VCC 22, the ground contact GND 26, the reset signal contact RST 23, the clock signal contact CLK 24, and the data input/output signal contact I/O 28. An ISO 7816 style card reader will normally provide these signals to the ICM 20 according to the electrical signals and transmission protocols defined in International Standard ISO 7816-3. The data present on the signal contact I/O 28 is generated either by the ICM 20 or by the interface circuit 54. The data on the I/O 28 is synchronous with the signal on the CLK 24. In the present embodiment of the invention, when a smart card is connected to an ISO 7816 interface, there is no connection to contact DP 25, contact VPP 27, and contact DM 29. The ISO style card reader 50 generates the RST signal 23 and the CLK signal 24. The ISO style card reader 50 provides for communication between the computer-based customer application and the smart card by means of the interposing electronic interface circuit 54. In the ISO mode, the I/O 28 contact is compatible with the ISO 7816 International Standard. Note that the ISO style reader 50 must contain active circuitry to convert ISO 7816 signals from the ICM 20 to the computer interface signals at the connector 53.

Figure 6:
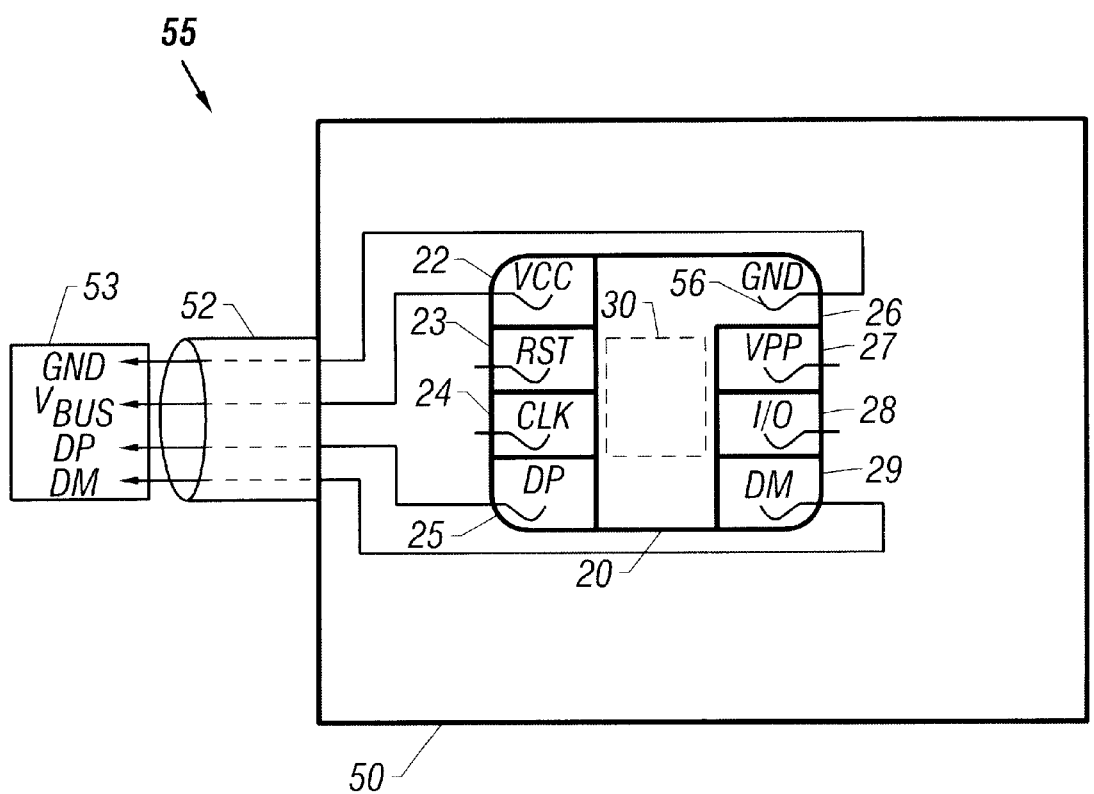
FIG. 6 shows a USB interface connection between an ICM and an USB style card reader.

Turning now to FIG. 6, FIG. 6 shows a USB interface connection between the ICM 20 positioned on a smart card 10 and a USB style card reader 50, as physically depicted in FIG. 4. Eight connector pins 56 within the smart card reader connect to the contacts 22–29 on the ICM 20. The electrical connections from the ICM 20 are carried via the cable 52 to a USB Series A plug connector 53. The USB compatible smart card 10 inserted in the USB style smart card reader 50 equipped with the USB cable 52 terminated by the USB series A plug connector 53 constitute a USB smart card device 55. The cable 52 utilizes four non-twisted wires for connecting the ICM 20 to the connector 53. The connector 53 may plug directly into a USB port 43 of a Host PC 40 root hub equipped with a series A receptacle or a USB port of a hub equipped with the same receptacle, as depicted in FIG. 4. The hub provides the VBUS power supply connected to the VCC contact 22 on the ICM 20, the ground contact GND connected to GND 26 on the ICM 20, the driver plus signal DP connected to DP 25 on the ICM 20, and the driver minus signal DM connected to DM 29 on the ICM 20. A USB style card reader will normally provide these signals to the ICM 20 according to the electrical and transmission protocols defined in the USB specification. In the present embodiment of the invention, when a smart card is connected to a USB interface, there is no connection to contact RST 23, contact CLK 24, contact I/O 28 and contact VPP 27. While the present embodiment of the invention makes use of contact DP 25 and contact DM 29, the ISO 7816 standard reserves these two contacts for future use.

Figure 7B:
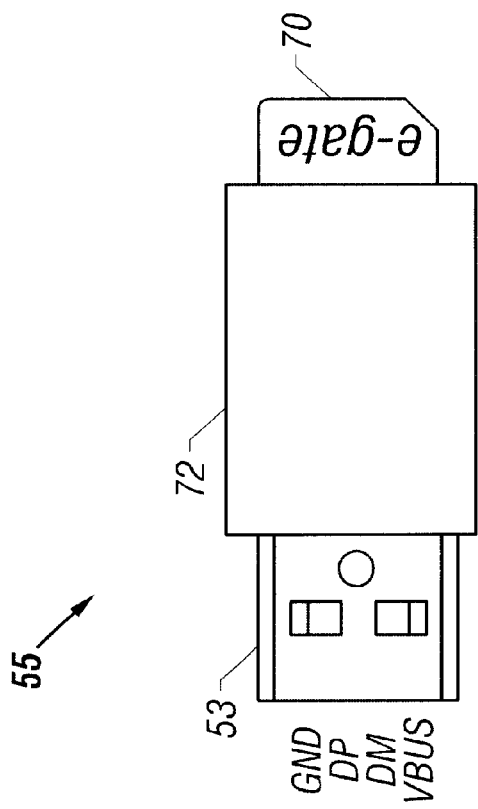
FIG. 7A shows a plug module and FIG. 7B shows a USB style token reader with a plug module inserted.
Figure 7A:
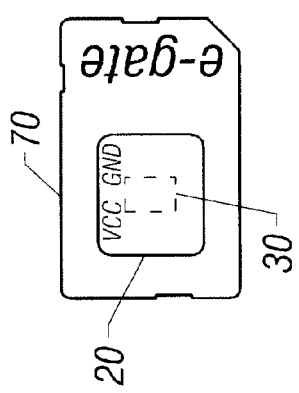

Turning to FIG. 7A and FIG. 7B, FIG. 7A shows a plug module 70 with an ICM 20 and the IC 30. FIG. 7B shows a token reader 72 with a plug module 70 inserted. This type of plug module 70 is widely used in SIM applications designed for GSM telephones. The connector 53 may plug directly into a USB port 43 of a Host PC 40 root hub equipped with a series A receptacle or a USB port of a hub equipped with the same receptacle, as depicted in FIG. 4. The electrical configuration of the ICM 20 positioned on the plug module 70 and the token reader 72 is the same as that depicted in FIG. 6, except that the plug connector 53 is attached to the token reader 72 rather than the cable 52. The USB compatible plug module 70 inserted in the USB style smart card reader 72 terminated by the USB series A plug connector 53 constitute a USB smart card device 55.

Figure 8:
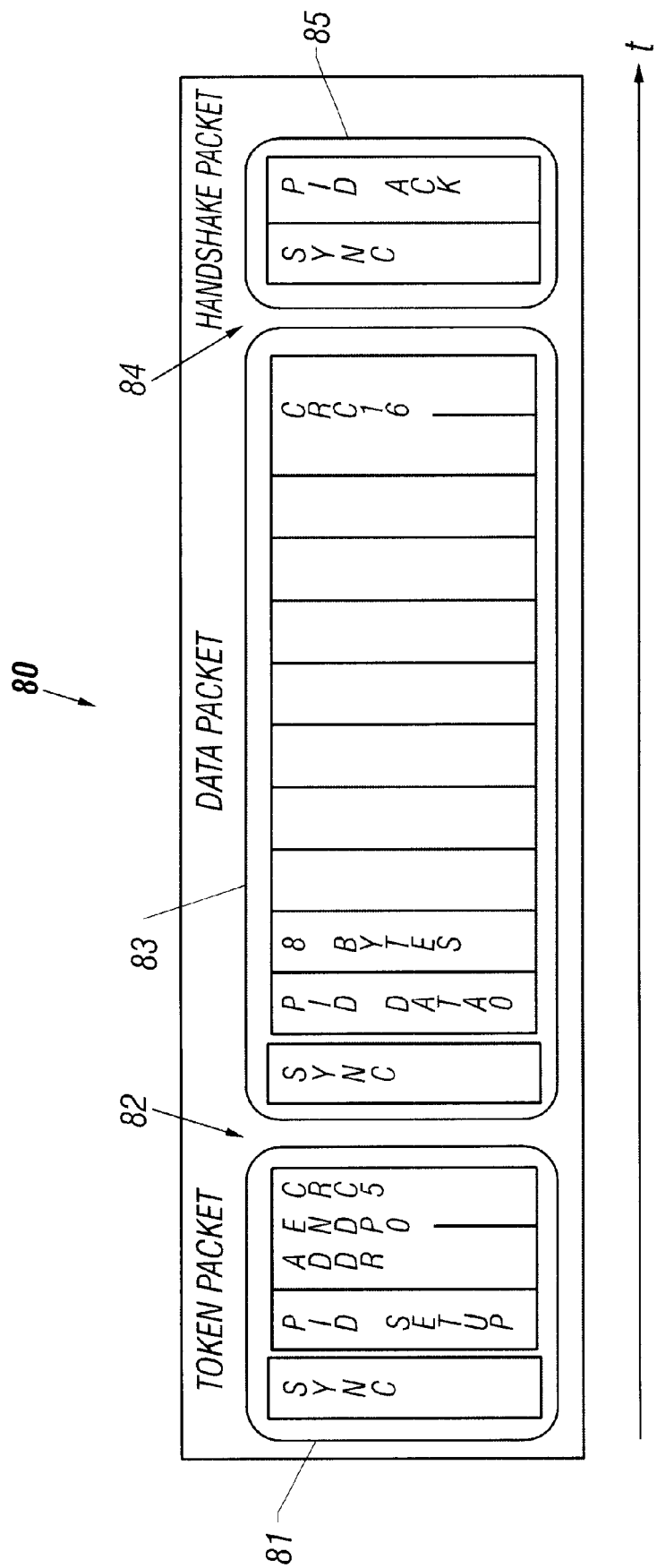
FIG. 8 shows a set-up phase of a USB control transfer that initiates any USB transaction.

Turning now to FIG. 8, FIG. 8 shows a set-up phase 80 of a USB control transfer that initiates a USB transaction over the DP and DM signal lines. The USB protocol is a half-duplex protocol initiated by a PC or Hub. A device responds to the request from the PC or Hub. Differential line drivers on both ends of the serial link are capable of sending data over the serial link. However only one end may be activated at a time for transmitting data over the USB serial link. The set-up phase 80 of a USB control transfer comprises 18 bytes consisting of a token packet 81 and a data packet 83 sent from a PC or Hub to a device, and a handshake packet 85 sent from a device to a PC or Hub. The token packet 81, sent by the host, comprises 4 bytes consisting of: an SP byte (SYNC); a PID for a SETUP stage; a device address (ADDR); an endpoint number (ENDPO); and a cyclic redundancy check (CRC5). The data packet 83, sent by a PC or Hub, comprises 12 bytes consisting of: an SP byte (SYNC); a PID for DATA0 byte; 8 bytes of data; and a 2-byte cyclic redundancy check (CRC 16). The token packet 81 and the data packet 83 are sent by a PC or Hub using a crystal driven clock. The device sends the handshake packet 85 to a PC or Hub. The handshake packet comprises 2 bytes consisting of an SP (SYNC) byte and a PID for ACK byte. In this particular embodiment, the device sends the handshake packet using the device clock CLK1X supplied by the UCR 33 in the IC 30 depicted in FIG. 3. The packets are separated by an inter-packet sequence. The token packet 81 is separated from the data packet 83 by an inter-packet sequence 82, and the data packet 83 is separated from the handshake packet 85 by an inter-packet sequence 84.

Figure 9:
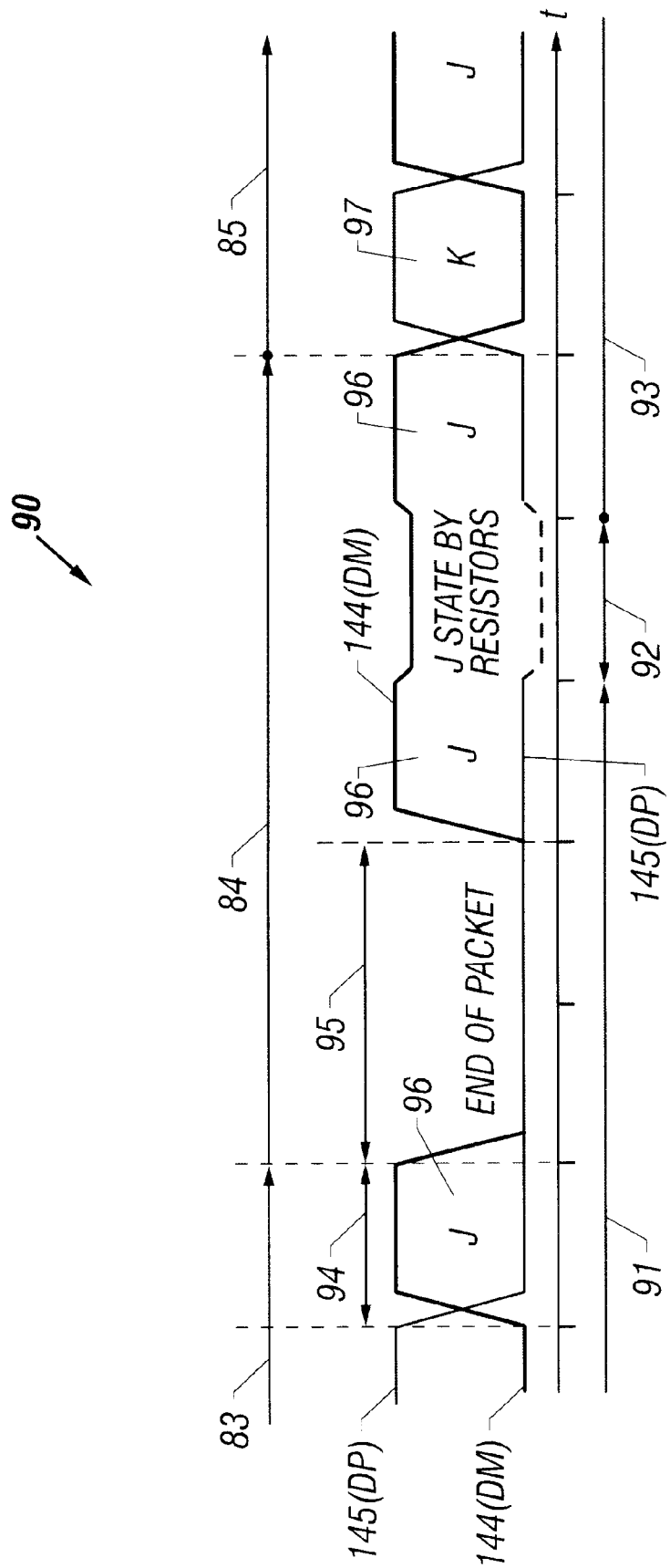
FIG. 9 shows the USB half-duplex protocol at the boundary of a data packet and a handshake packet.

Turning now to FIG. 9, FIG. 9 depicts a USB half-duplex protocol 90 at the boundary 84 of a data packet 83 and a handshake packet 85. This depiction 90 is based on the USB low speed mode where one bit has a time period indicated by a time duration 94. The hub drives the bus to transfer the data packet 83 to the device. The differential signals DP 145 and DM 144 comprise the serial data bus. A Single-Ended Zero (SE0) is defined as the condition when both DP 145 and DM 144 are at a low voltage state. An End of Packet consists of a SE0 condition for approximately two bit times 95 followed by a J state 96 for one more bit time. A J state 96 is defined as the condition when DP 145 is at a low state and DM 144 is at a high state. A K state 97 is defined as the condition when DP 145 is at a high state and DM 144 is at a low state. The hub drives the USB during this time 91. After an End of Packet, the USB serial data bus is idle during at least on bit period 92. The device then begin to drive the USB data bus during this time 93 by placing a J state 96 on the bus followed by an SP byte of a handshake packet 85. The SP byte starts with a J 96 to K 97 transition. The device generates its own clock locked in phase with the hub clock using the SP signals and subsequent downstream data flow transitions sent by the hub. The present invention provides a novel solution for the device to recover the time reference from the hub signals and eliminating the need for external components in the device like a resonator or crystal. Table 1 defines signal DP and DM combinations for a low speed set up.

TABLE 1

| | |
|---|---|
| Differential "1" | DP >2.8 Volts and DM <0.3 Volts |
| Differential "0" | DP <0.3 Volts and DM >2.8 Volts |
| Data J state | Differential "0" |
| Data K state | Differential "1" |
| Single Ended Zero (SE0) | DP <0.3 Volts and DM <0.3 Volts |

Figure 10:
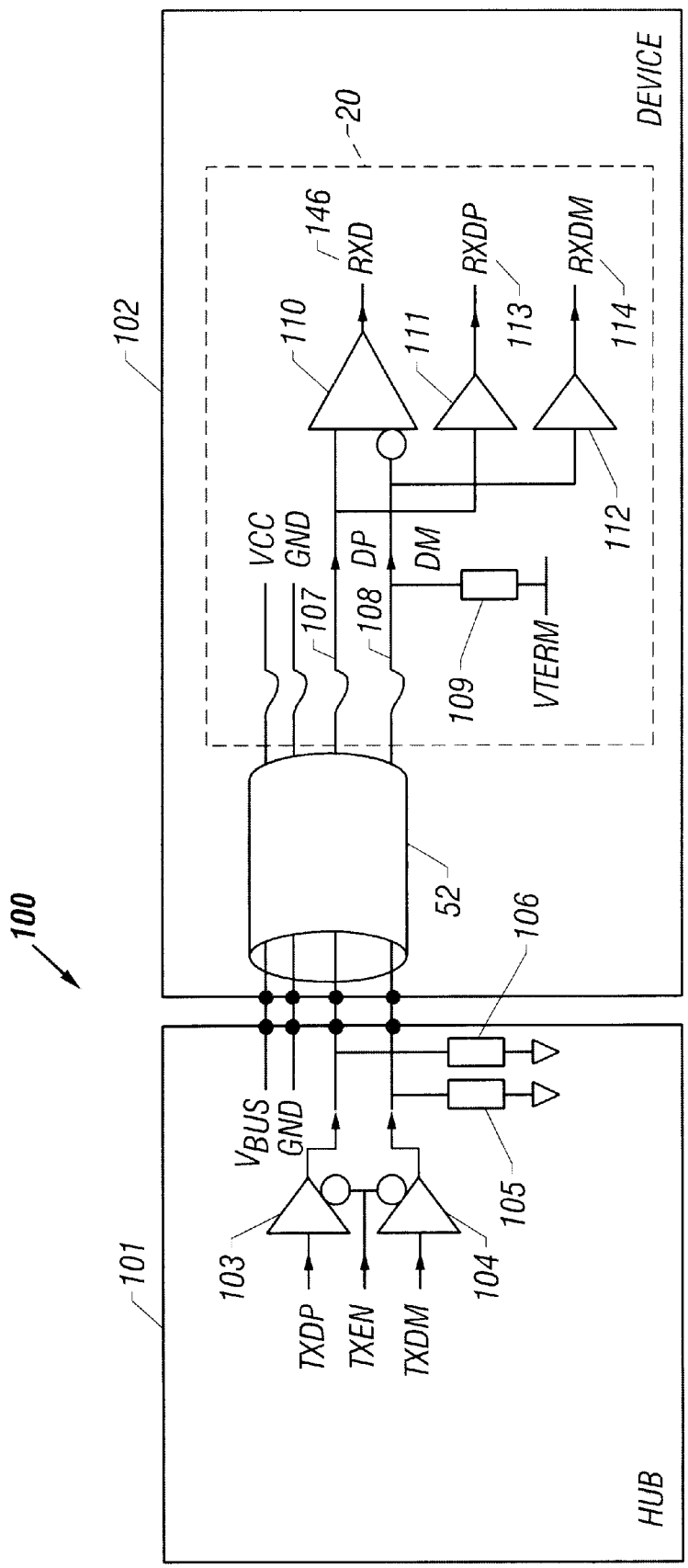
FIG. 10 shows a downstream configuration of a Hub transmitting data to a device containing an ICM.

Turning now to FIG. 10, FIG. 10 depicts a downstream transaction. The configuration 100 of a hub 101 transmitting data to a device 102 containing an ICM 20 described above via a cable 52. For a token reader 72 such as on FIG. 7B there is no cable 52. The hub 101 drives the USB data bus using transmitters 103, 104 to drive the DP signal line 107 and the DM signal line 108. The signal TXEN feeding 103 and 104 is at "0". The hub contains pull-down resistors 105, 106 connected between the DM signal line 108 and ground, and between the DP signal line 107 and ground. In accordance with the USB Specification the ICM 20 contains a pull-up element 109 connected between the DM signal line 108 and VTERM. VTERM is a pull up voltage of between 3.0 and 3.6 volts. This configuration defines the low speed implementation. The ICM 20 receives the transmitted signals DP 145 and DM 144, and generates the signals RXD 146, RXDP 113, and RXDM 114. RXD is an output signal from a differential receiver 110. For a J state, RXD is a logical "0", and for a K state, RXD is at a logical "1". RXDP and RXDM are signals from single ended receivers 111, 112. RXDP and RXDM are used to detect the end of packet.

Figure 11:
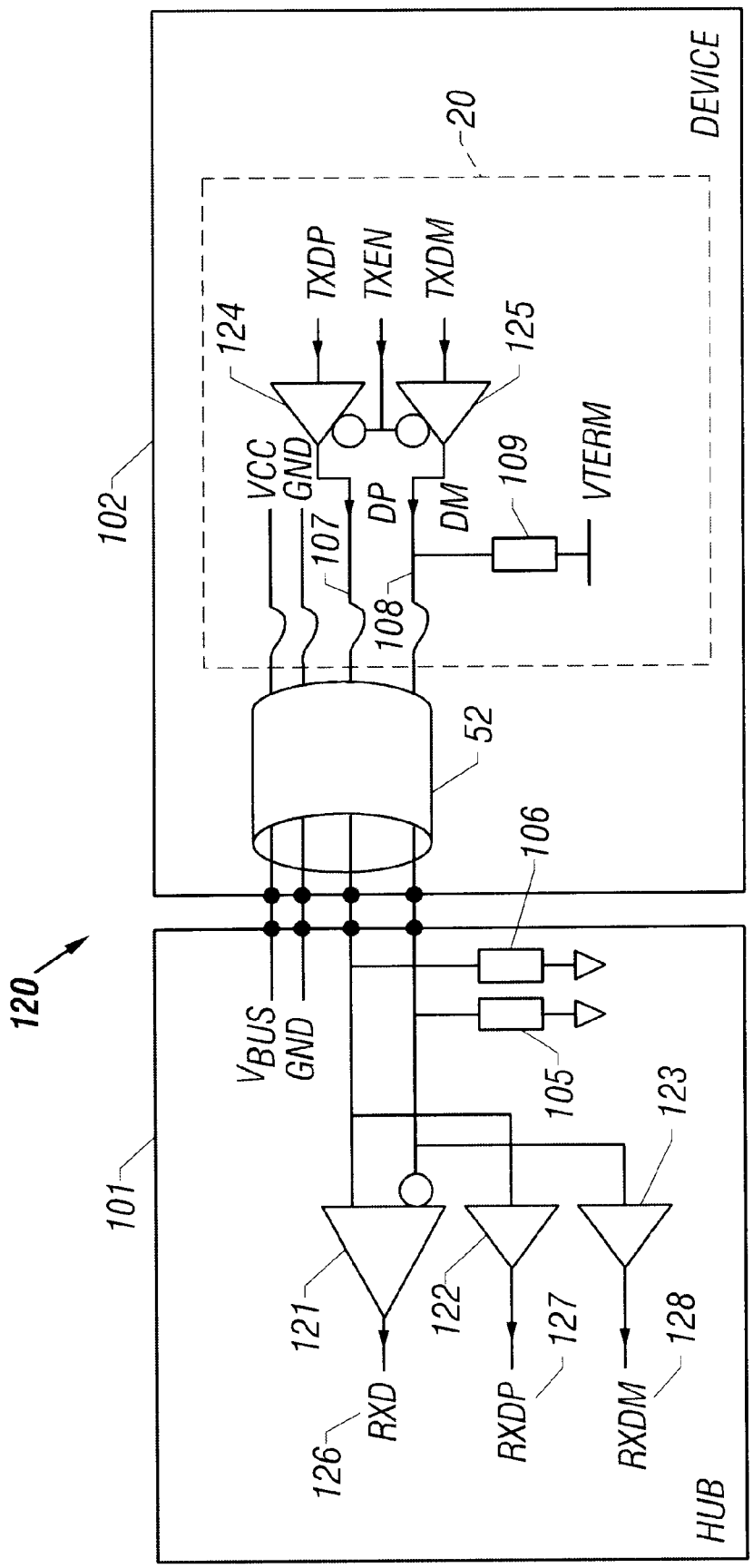
FIG. 11 shows an upstream configuration of a device containing an ICM transmitting data to a Hub.

Turning now to FIG. 11, FIG. 11 shows upstream transactions. The configuration 120 depicts a device 102 transmitting data to a hub 101 via a cable 52. For a token reader 72 such as on FIG. 7B there is no cable 52. The device 102 contains an ICM 20 described above. The device 102 drives the USB data bus using transmitters 124, 125 to drive the DP signal line 107 and the DM signal line 108. The signal TXEN connected to the bus transmitters 124, 125 is at "0". The hub 101 contains pull-down resistors 105, 106 connected between the DM signal line 108 and ground, and between the DP signal line 107 and ground. In accordance with the USB Specification the ICM 20 contains a pull-up element 109 connected between the DM signal line 109 and VTERM. VTERM is a pull up voltage of between 3.0 and 3.6 volts. This configuration defines the low speed implementation. The hub 101 receives the transmitted signals DP 107 and DM 108, and generates the signals RXD 126, RXDP 127, and RXDM 128. RXD is an output signal from a differential receiver 121. For a J state, RXD 126 is a logical "0", and for a K state, RXD 126 is at a logical "1". RXDP 127 and RXDM 128 are signals from single ended receivers 122, 123. RXDP 127 and RXDM 128 are used to detect the end of packet.

Figure 12:
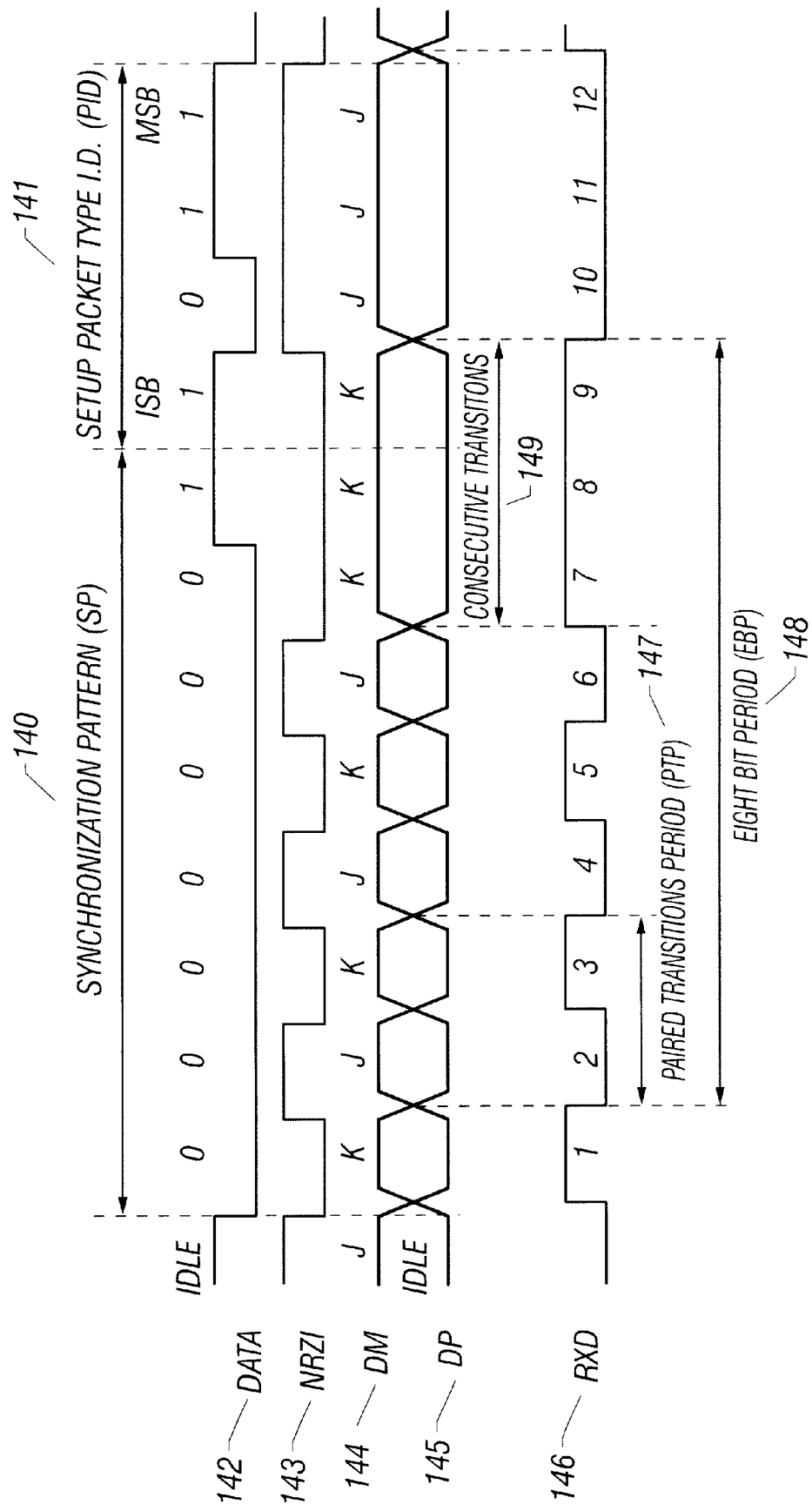
FIG. 12 shows the waveforms of the signals generated in the beginning of a token packet from a hub to a device.

Turning now to FIG. 12, FIG. 12 shows the waveforms of the signals transmitted in the beginning of a token packet 81 in a downstream transaction from a hub 101 to a device 102 containing an ICM 20 discussed above. The message 142 sent by the hub to the device via USB transmitters 103 and 104 is a bit serial data flow. The token packet 81 transmits first a SP 140 followed by a SETUP PID 141. This data flow is encoded in Non Return to Zero Inverted (NRZI) 143 format. A characteristic of the NRZI format is that when the next data bit is a logical "0" (see the Data waveform 142), the NRZI encoded signal changes state (see NRZI waveform 143). The NRZI signal is connected to the host TXDM signal transmitter (104 in FIG. 10) that provides DM 144, and the inverted NRZI signal is connected to the host TXDP signal transmitter (103 in FIG. 10) that provides a signal on DP 145. RXD 146 is the received signal from the device differential receiver (110 in FIG. 10). The waveforms show that the SP often named SYNC is 00000001 [lsb - - - msb], while the PID for the SETUP stage is 1011 [lsb - - - msb]. To measure one bit duration sent by the host 101, one must take into account the fact that the leading edge and the trailing edge of a received differential RXD 126 may not be identical and that the signal may have jitter. Jitter is caused by successive repeaters across the USB architecture. Measuring multiple Paired Transitions Period (PTP) 147 or Consecutive transitions 149 reduces the jitter influence. A PTP is not influenced by the mismatching between the leading edge and the trailing edge of DM 144 and DP 145 and is a preferred embodiment compatible with known received patterns. Measuring Eight Bit Period bits 2–9 (EBP) 148 provides a further improvement compatible with an optimized hardware implementation. Since hub transceivers turn on delay deteriorates the bit 1 period, in this preferred embodiment bit 1 is not used.

Figure 13:
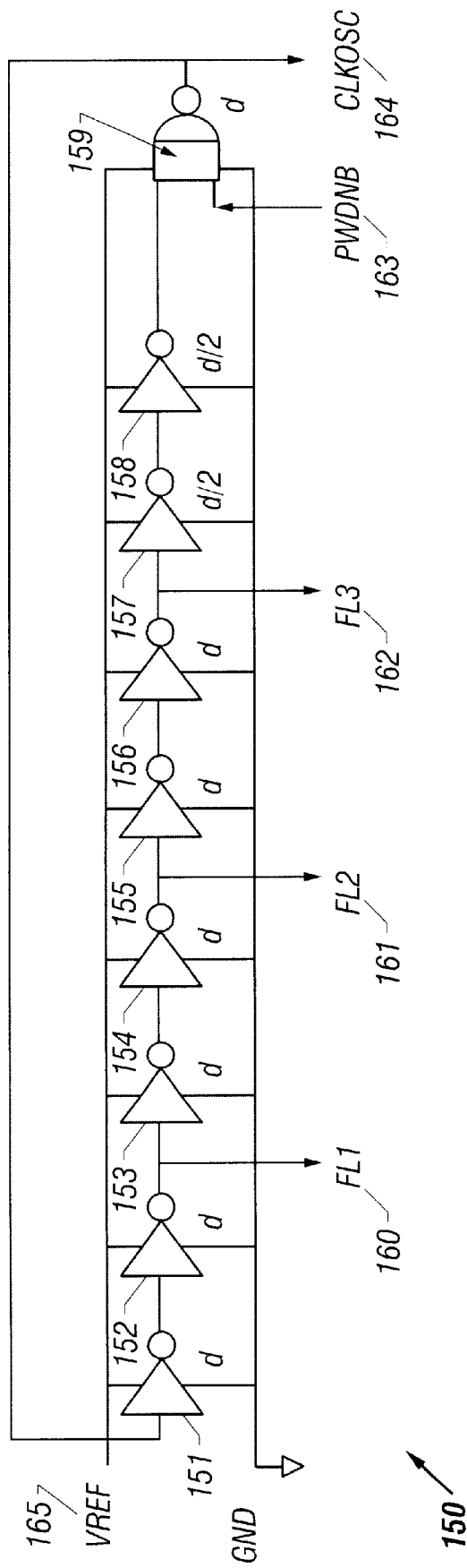
FIG. 13 shows an embodiment of a clock signal generator that generates the signal CLKOSC with eight intervals.

Turning now to FIG. 13, FIG. 13 shows an embodiment of a clock signal generator 150 that generates the signal CLKOSC 164. The clock signal generator 150 comprises a ring oscillator consisting of eight inverters 151–158 and a gated inverter 159. The clock signal generator is supplied by a stable voltage reference VREF 165 to minimize frequency variations due to VCC supply voltage variations. Each inverter 151–156 delivers an output signal that is delayed from the corresponding inverter input signal by an average delay d. Inverters 157 and 158 deliver an output signal that is delayed from the corresponding inverter input signal by an average delay d/2. NAND gate 159 delivers an output signal that is delayed from the corresponding input signal by an average delay d. The signal Power Down PWDNB 163 is active at "0". It enables or disables the ring oscillator from oscillating by controlling the feedback path from the output CLKOSC 164 of the NAND gate 159 to the first inverter 151. Disabling the oscillator conserves power. The period of the oscillator output signal CLKOSC 164 is equal to twice the sum of each inverter 151–158 delay and the gated inverter 159 delay. Process variations affect the period of the oscillations by as much as, typically, ±30%. The nominal frequency is 50 MHz. In the embodiment shown, the ring oscillator 150 delivers four phase-shifted signals FL1 160, FL2 161, FL3 162, their logical complements, and CLKOSC 164, which on a CLKOSC period define eight intervals. The gated inverter 159 is used to stop the free running clock through PDWNB 163. From one IC to the other this frequency is within the 38 MHz to 74 MHz range. The CLKOSC 164 signal period is equal to two times the sum of each inverter delay and the gated inverter delay:

CLKOSC 164 signal period=2(7d+2*½d)=16d where d is the average delay of one gate (~1.25 ns).

Figure 14:
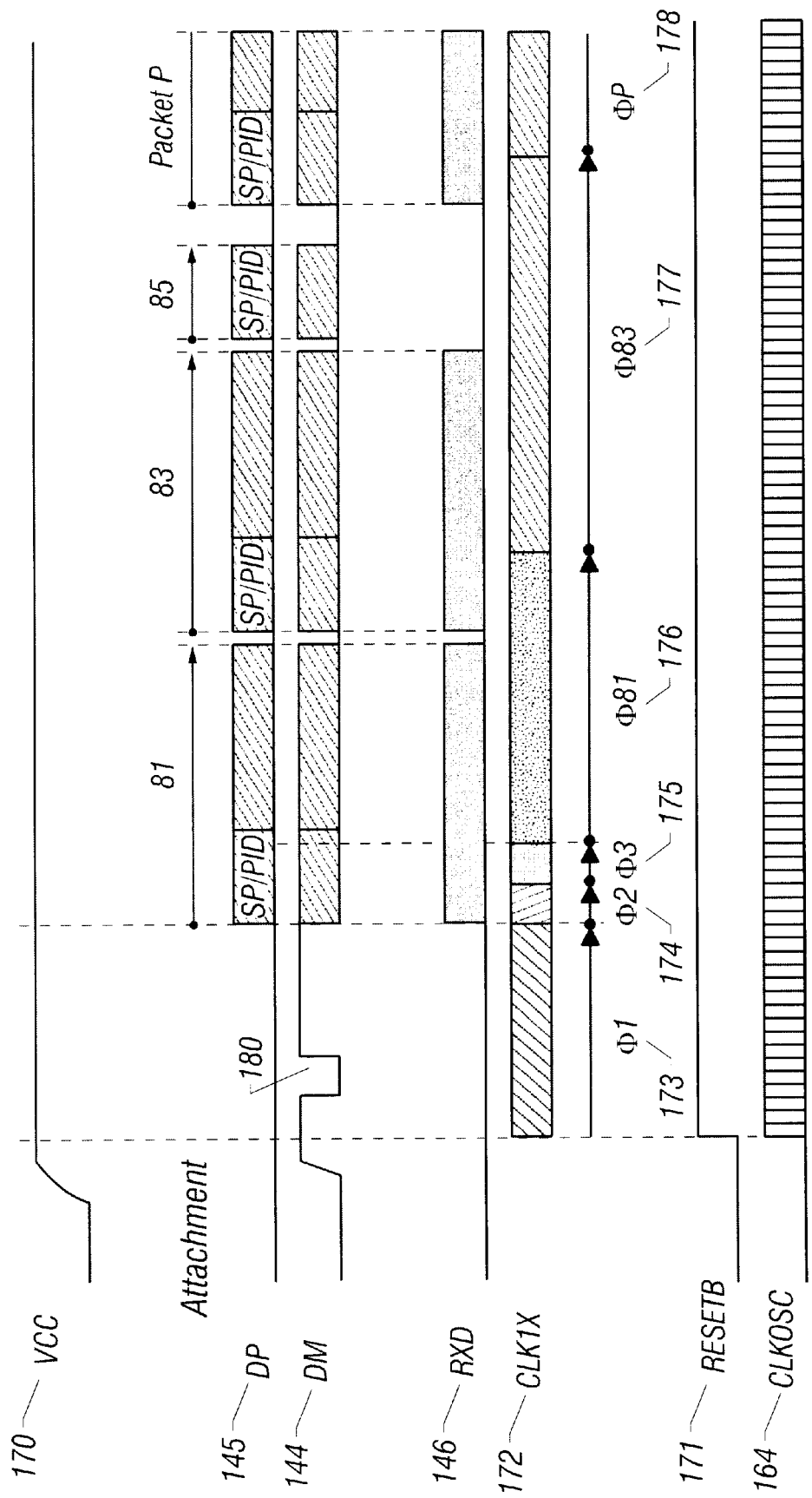
FIG. 14 shows the waveforms when a device is attached to the USB.

Turning now to FIG. 14, FIG. 14 shows the waveforms VCC 170, DP 145, DM 144, received by IC 30 included in ICM 20 itself embedded into a smart card 10 or a module plug 70 itself respectively inserted into a smart card reader or a token. The assembled USB device 55 is connected to a USB hub port. The waveforms RXD 146, CLK1X 172, RESETB 171 and CLKOSC 164 are generated within the IC. These waveforms are typical of the power up sequence in the IC 30 of the USB device 55 connected to the USB port. The chronogram starts just before the USB device signals to the hub that it is attached to the USB by pulling up the DM pin voltage. RESETB is generated aboard the USB interface block 34 depicted in FIG. 3. When VCC 170 reaches the required minimum voltage, RESETB goes to "1", the pull up effect on DM is detected by the host and the device is declared attached to the USB. The CLKOSC 164 starts. The hub sends an extended SE0 180 to reset the USB interface 34 within IC 30.

In downstream transactions, the signal RXD 146 must be sampled by CLK1X 172 to determine the received data. The sampling should occur at approximately 330 ns after the beginning of the theoretical bit cell (middle of the bit cell ±¼). In upstream transactions, the signals DP 145 and DM 144 on lines 107 and 108 are timed by CLK1X 172.

During Φ1 173, there is no received data, CLK1X period is equal to CLKOSC period, known at ±30% but stable, divided by M. During Φ2 174, the sampling of the token packet 81 RXD 146 is done by CLK1X in reference with M/2 CLKOSC periods by a timer initialized by each leading edge of the received bit cell. During Φ3 175, the sampling of the token packet 81 is done by CLK1X in reference with CLKOSC scaled by measurements done during Φ2 174 on two PTP 147. During ()81 176 the sampling of the token packet 81 and the data packet 83 is done in reference with CLKOSC 164 scaled by measurements done during Φ2 174, and Φ3 175, on EBP 148 in SP and PID of Packet 81. During Φ83 177 the sampling of the data packet 83 is done in reference with CLKOSC 164 scaled by measurements done on EBP in SP and PID of Packet 83. During Φ83 177 the upstream pulsing of the handshake 85 is done in reference with CLKOSC 164 scaled by measurements done EBP in SP and PID of Packet 83. During ΦP 178 the sampling of the Packet P is done in reference with CLKOSC 164 scaled by measurements done on EBP in SP and PID of Packet P. A power down sequence will end up the ongoing process of calibrating inaccurate, but stable, CLKOSC on downstream accurate known bit periods. A power up sequence will restart the process at Φ1 173.

Figure 15:
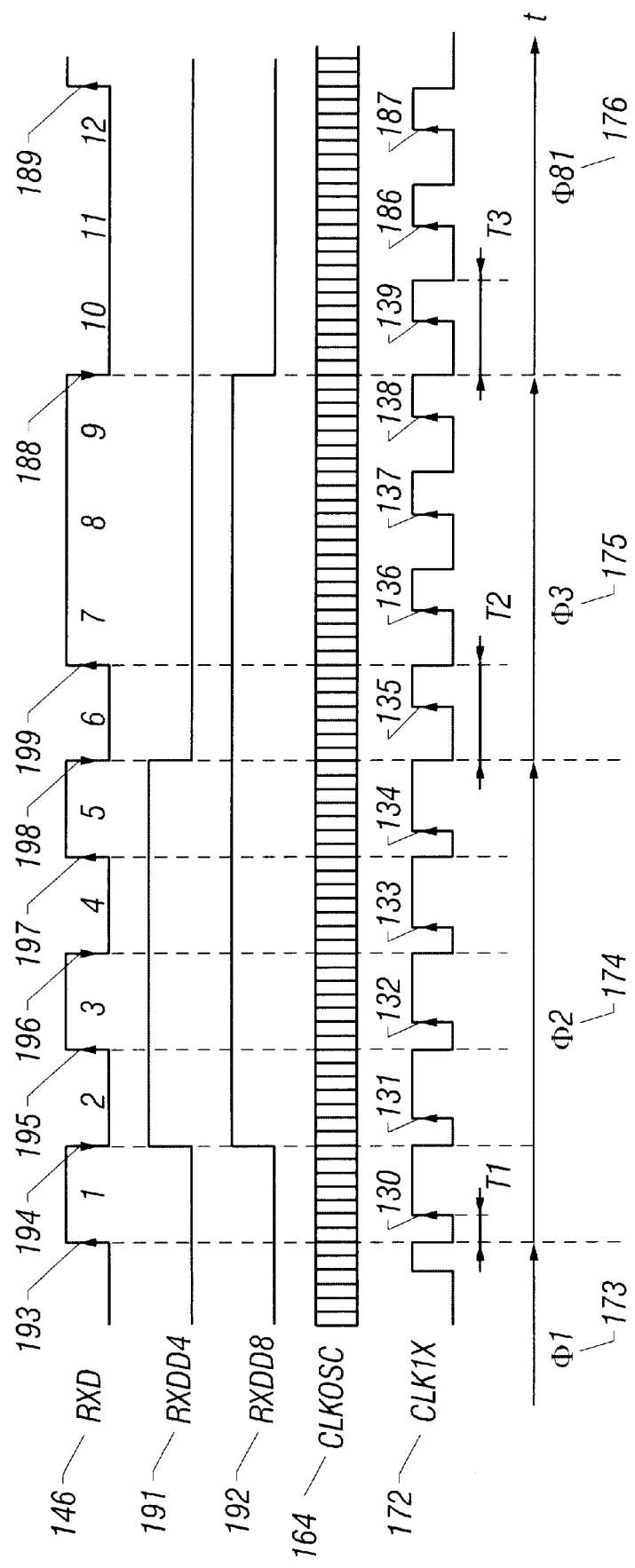
FIG. 15 shows the waveforms when a device receives the first token packet.

Turning now to FIG. 15, FIG. 15 shows CLK1X four phases: Φ1 173, Φ2 174, Φ3 175 and Φ81 176. In a particular embodiment of the invention these four phases are required to synchronize a USB smart card device 55 clock signal within an ICM 20. RXD 146 reproduces the transmitted signal by the hub in the IC 30. The signal RXDD4 191 is initialized to a "0" state and is caused to change logical state (logical complement) when edge 194 occurs as well as when the edge 198 occurs four bit later due to the SP. The signal RXDD8 192 is initialized to a "0" state and is caused to change to logical state when edge 194 occurs as well as when the edge 188 occurs eight bits later. CLKOSC 164 is a free-running clock signal generated within the ICM 20 as described above on FIG. 13.

CLK1X 172 is generated using RXD 146, RXDD4 191, RXDD8 192 and CLKOSC. CLK1X is used to sample RXD, the downstream data flow received by the device from the hub, and to time the upstream data flow from the device to the hub. Bit periods associated with bits 1–12 are indicated on RXD for reference purposes. The bit number 1 does not define an accurate time period compared with the other bits in SP 140 and PID 141. This is due to the turn-on time of each transmitter along the USB architecture. In this application, bit number 1 is not used to generate the local clock CLK1X 172 within the ICM of the USB device.

During Φ1 173, delimited on one end by the USB reset signaling, depicted in FIG. 14, and the edge 193 on RXD 146, which defines the beginning of the SP 140, no bit has to be recognized. By default CLK1X 172 is a free running clock with a period equal to M times the CLKOSC period. M is equal to 32 for example, that is a nominal period of 640 ns compared to 666.66 ns the theoretical bit duration.

During Φ2 174, three tasks are performed.
  a. Incoming bit recognition by sampling RXD as close as possible of the middle of the bit cell using CLKOSC 164. The bit 1 is sampled by the edge 130 of CLK1X 172. The edge 193 of RXD 146 resets a timer T1, which counts M/2=16 CLKOSC periods to generate the edge 130. The following bits 2, 3, 4 and 5 are respectively sampled by 131, 132 133 and 134 using the same principle as above in reference to edges 194, 195, 196 and 197. The timer T1 is characterized by its duration in relation with the free running clock CLKOSC and its arming mechanism. The incoming bits 1, 2, 3, 4 and 5 are validated at 320 ns ±30% after each leading edge of the bit cell.
  b. Timing of RXDD4 191 including bits 2, 3, 4 and 5 using CLKOSC 164.The timing of the two PTP RXDD4 191 including bits 2, 3, 4 and 5 using CLKOSC 164 determines a first relationship between four bits duration sent by the hub in reference to CLKOSC 164. Four bits last approximately 2660 ns.

That is N approximately equal to 133 CLKOSC periods in four bits. One bit duration is approximately N/4= 133/4=33±1 CLKOSC periods. The number of CLKOSC periods N/4 in one bit may be checked against limits taking into account CLKOSC period spread.

c. Timing of RXDD8 192 including bits 2, 3, 4 and 5 will continue during Φ3 using CLKOSC 164.

During Φ3 175, two tasks are performed.

a. Incoming bits 6, 7, 8 and 9 recognition by sampling RXD 146 in the middle of the bit cell using first relationship result. The incoming bit 6 is sampled by the edge 135 of CLK1X 172. The edge 198 enables a free running CLK1X 172 having a period T2 using the result of the first relationship above, that is, N/4 CLKOSC periods in one bit cell. Bits 7, 8 and 9 are sampled by CLK1X transitions 136, 137, 138. The SP is detected.

b. Terminating the RXDD8 191 timing including bits 2–9 using CLKOSC 164. The timing of the EBP RXDD8 192 including bits 2, 3, 4, 5, 6, 7, 8 and 9 using CLKOSC 164 determines a second relationship between eight bit duration sent by the hub in reference to CLKOSC 164. EBP is compatible with paired transition period and any kind of PID involved in downstream transactions. Eight bits last ~5320 ns. We have K81 (~266) CLKOSC periods in eight bits. This timing takes the most out of the SP and beginning of PID patterns to reduce the jitter influence and define the CLK1X period T3 used during the next phase.

During Φ81 176 the incoming bit 10 is sampled by the edge 139 of CLK1X 172. The edge 188 enables a free running signal having a period T3 using the result of the second relationship that is K/8=Integer Part (K81/8)+J81*⅛ CLKOSC periods in one bit cell. Bits 11 and 12 are sampled by 186 and 187. The counter generating CLK1X 172 uses FL1 160, FL2 161, FL3 162, their logical complements, and CLKOSC 164 separated by ⅛th of the CLKOSC period see FIG. 13. Since CLK1X period is known to be ±⅛ CLKOSC period, there is no rounding error. Furthermore each edge in the downstream RXD 146 synchronizes CLK1X 172 during Φ81 176. The incoming bit 10 is validated at 320 ns ±0.4% after the leading edge 188 of the bit cell 10. Other bits 11 and 12 will be sampled at a slightly different moment in their bit cell. The USB protocol is taking care of having one bit data toggle every 7 bits minimum. This guaranties that CLK1X 172 is locked in phase with the downstream data flow.

Figure 16:
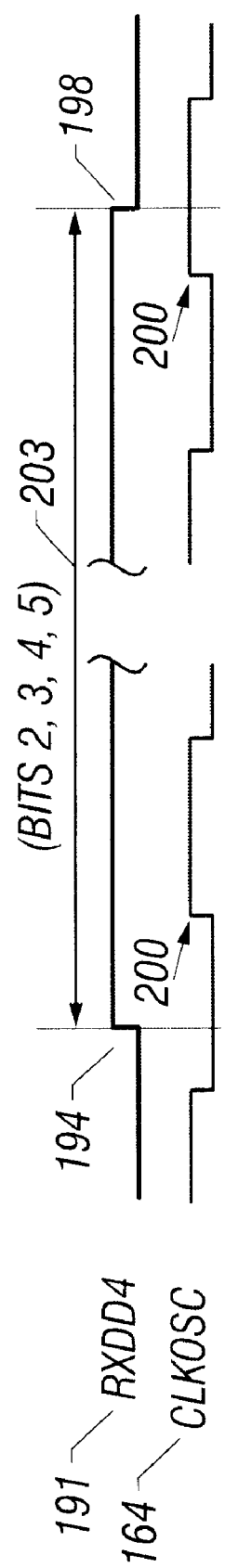
FIG. 16 shows the clock signal CLKOSC in relation to the RXDD4 signal.

Turning now to FIG. 16, FIG. 16 shows two PTP on RXDD4 191 gating CLKOSC 164. A first relation ship determines how many positive edges N 200 of CLKOSC 164 are included between a positive edge 194 and a next negative edge 198 of RXDD4 191, which includes the beginning of bit 2 and the end of bit 5. As an example in the nominal case, N=4*666.66 ns/20 ns≈133.

Figure 17:
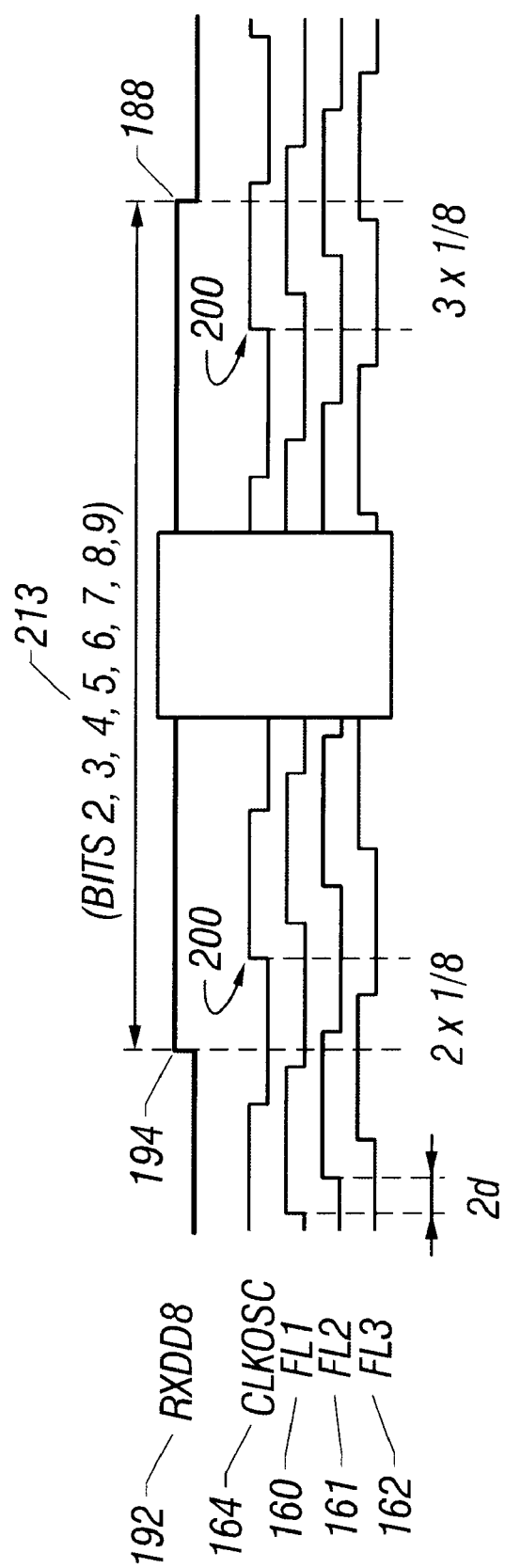
FIG. 17 shows the clock signal CLKOSC in relation to the RXDD8 signal.

Turning now to FIG. 17, FIG. 17 shows EBP on RXDD8 192 gating CLKOSC 164. A second relation ship determines how many positive edges K 200 of CLKOSC 164 are included between a positive edge 194 and a next negative edge 188 of RXDD8 192, which includes the beginning of bit 2 and the end of bit 9. As an example in the nominal case, KP=8*666.66 ns/20 ns≈266.

KP is then divided by 8 that is IP (KP/8)+JP*⅛. Each of the signals, CLKOSC 164, FL1 160, FL2 161 and FL3 162, is delayed by a time equal to ⅛$^{th}$ of the CLKOSC period.

Figure 18:
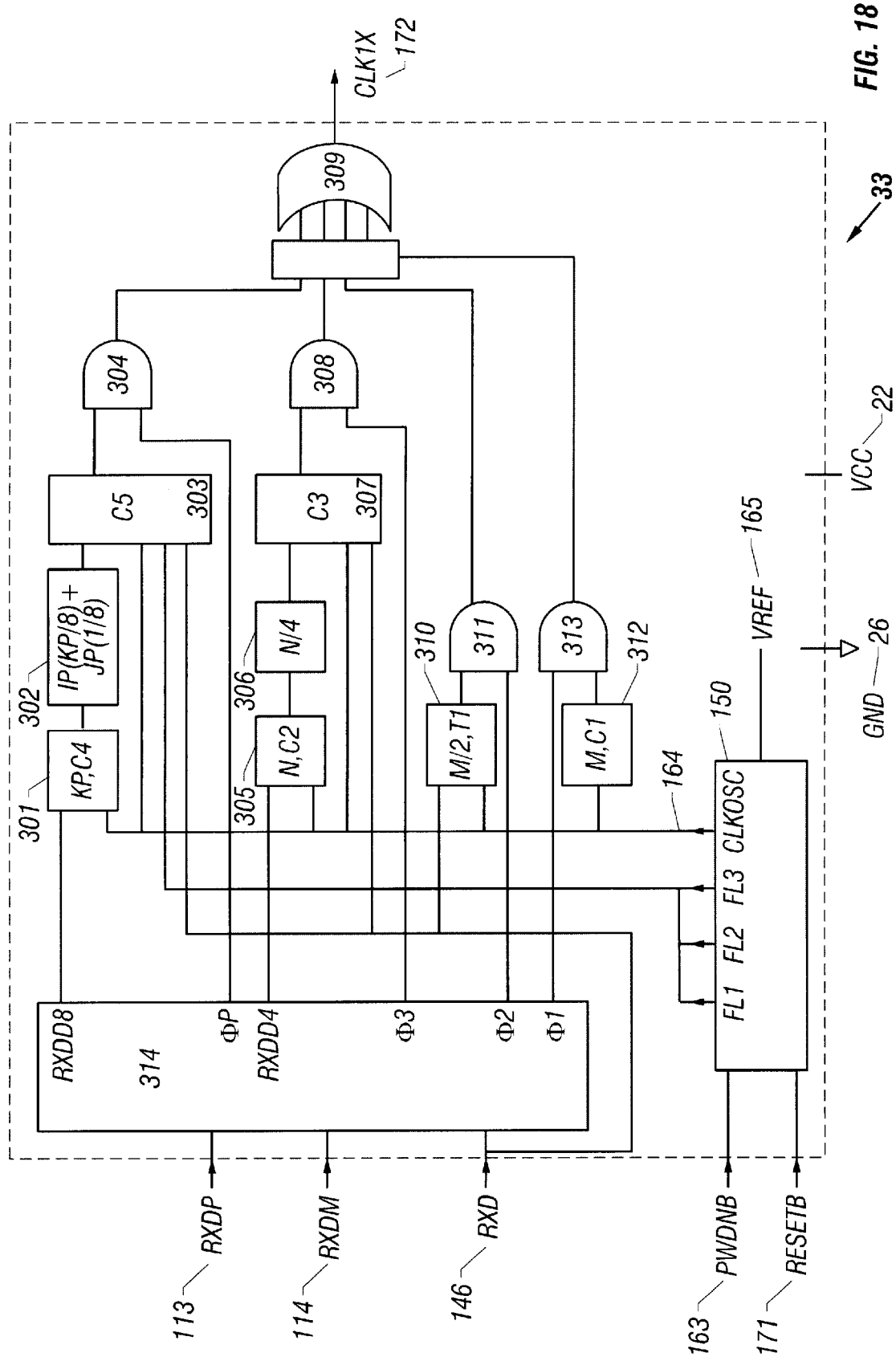
FIG. 18 shows a logical implementation of the local clock CLK1X.

Turning now to FIG. 18, FIG. 18 shows a logical implementation of the USB clock recovery, UCR 33, depicted in FIG. 3. Signals RXDP 113, RXDM 114 and RXD 146 are coming from the receiver front end of the USB smart card device, USB interface 34 depicted in FIG. 3. PWDNB 163 and RESETB 171 are generated aboard IC 30. RXD 146, RXDP 113, and RXDM 114 are connected to a circuit 314 that generates RXDD8, RXDD4, ΦP, Φ3, Φ2 and Φ1.

During Φ1, CLK1X 172 is generated from CLKOSC 164 divided by a built in value M in a circuit 312, and transmitted through AND gate 313 and OR gate 309. During Φ2, CLK1X 172 is generated from CLKOSC 164 and RXD 146 using a built in value M/2 in a circuit 310, and transmitted through AND gate 311 and OR gate 309. During Φ3, CLK1X 172 is generated using N, a first measured value N in a circuit 305, a divider by 4 in a circuit 306 that connects to a circuit 307. CLKOSC 164 and RXD 146 are also connected to inputs of circuit 307, whose output is transmitted through AND gate 308 and OR gate 309. During ΦP, CLK1X 172 is generated using a second measured value KP in a circuit 301 connected to a divider by 8 circuit 302 whose output is connected to a circuit 303. CLKOSC 164, FL1, FL2, FL3 and RXD 146 also connect to inputs of the circuit 303, whose output is transmitted through AND gate 304 and OR gate 309.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A method for generating a local clock signal in a device using Universal Serial Bus downstream signals DP and DM, comprising;

a) receiving the USB downstream differential signals DP and DM and generating a downstream bit-serial signal from the USB downstream signals;

b) counting a number of cycles R of a free-running high frequency clock signal contained within a known number of bit periods S of the received downstream bit-serial signal;

c) dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal; and d) generating a local clock signal having a period equal to the number of free-running high frequency clock cycles T.

2. A method according to claim 1 wherein the step of generating the local clock signal comprises:

a) counting the number of the free-running high frequency clock cycles T to generate a period of the local clock signal; and a) initializing the counting step when there is a data toggling in the received downstream bit serial signal for locking in phase the generated local clock with the received downstream bit serial signal.

3. A method according to claim 1, wherein the step of generating the local clock signal further comprises updating the period of the local clock signal when a known received downstream bit serial pattern is recognized.

4. A method according to claim 1, wherein the known number of bit periods S of the received downstream bit-serial signal is eight.

5. A method according to claim 1, further comprising generating the free-running high frequency clock signal with a ring oscillator.

6. A method according to claim 5, wherein the step of generating the free-running high frequency clock signal with a ring oscillator further comprises generating an even number of signals V having a period of the free-running high frequency clock signal and the phase shifted of 360°/V.

7. A method according to claim 6, wherein the even number of signals V is eight.

8. A method according to claim 1, wherein the method is implemented in an integrated circuit module.

9. A method according to claim 8, wherein the integrated circuit module is positioned on a smart card.

10. A method according to claim 1, wherein the local clock signal is phase locked with the downstream bit serial signal at least once every seven bit periods of the downstream bit serial signal by the use of bit-stuffing.

11. A method according to claim 1, wherein the counting step is performed during a period of time when the downstream bit serial signal comprises a Sync byte and a PID byte of a USB Token Packet and Data Packet.

12. A method according to claim 3, wherein the known received downstream bit serial pattern is within a Sync byte and a PID byte of a USB Token Packet and Data Packet.

13. A method according to claim 1, further comprising a step for determining if T is within predefined limits.

14. A method according to claim 1, wherein the local clock signal is used to sample the USB received downstream serial bit data and to time the USB transmitted upstream serial bit data.

15. A device containing a circuit for generating a local clock signal using Universal Serial Bus downstream signals DP and DM, comprising;
   a) means for receiving the USB downstream differential signals DP and DM and generating a downstream bit-serial signal from the USB downstream signals;
   b) means for counting a number of cycles R of a free-running high frequency clock signal contained within a known number of bit periods S of the received downstream bit-serial signal;
   c) means for dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal; and
   d) means for generating a local clock signal having a period equal to the number of free-running high frequency clock cycles T.

16. A device according to claim 15 wherein the means for generating the local clock signal comprises:
   a) means for counting the number of the free-running high frequency clock cycles T to generate a period of the local clock signal; and
   b) means for initializing the counting step when there is a data toggling in the received downstream bit serial signal for locking in phase the generated local clock with the received downstream bit serial signal.

17. A device according to claim 15, wherein the means for generating the local clock signal further comprises means for updating the period of the local clock signal when a known received downstream bit serial pattern is recognized.

18. A device according to claim 15, wherein the known number of bit periods S of the received downstream bit-serial signal is eight.

19. A device according to claim 15, wherein the means for generating the free-running high frequency clock signal is a ring oscillator.

20. A device according to claim 19, wherein the means for generating the free-running high frequency clock signal with a ring oscillator further comprises means for generating an even number of signals V having a period of the free-running high frequency clock signal and the phase shifted of 360°/V.

21. A device according to claim 20, wherein the even number of signals V is eight.

22. A device according to claim 15, wherein the circuit is implemented in an integrated circuit module.

23. A device according to claim 22, wherein the integrated circuit module is positioned on a smart card.

24. A device according to claim 15, wherein the local clock signal is phase locked with the downstream bit serial signal at least once every seven bit periods of the downstream bit serial signal by the use of bit-stuffing.

25. A device according to claim 15, wherein the counting means is performed during a period of time when the downstream bit serial signal comprises a Sync byte and a PID Setup byte of a USB Token Packet and Data Packet.

26. A device according to claim 17, wherein the known received downstream bit serial pattern is within a Sync byte and a PID byte of a USB Token Packet and Data Packet.

27. A device according to claim 15, further comprising a means for determining if T is within predefined limits.

28. A device according to claim 15, wherein the local clock signal is used to sample the USB received downstream serial bit data and to time the USB transmitted upstream serial bit data.

29. A device containing a circuit for generating a local clock signal using Universal Serial Bus downstream signals DP and DM, comprising:
   a) a differential receiver for receiving the USB downstream differential signals DP and DM and generating a downstream bit-serial signal from the USB downstream signals;
   b) a first counter connected to the bit serial signal for counting a number of cycles R of a free-running high frequency clock signal contained within a known number of bit periods S of the received downstream bit-serial signal;
   c) a divider circuit for dividing the counted number of cycles R of the free-running high frequency clock signal by the known number of bit periods S of the received downstream bit-serial signal for determining a resultant number of the free-running high frequency clock cycles T contained within a single bit period of the received downstream bit-serial signal; and
   d) a second counter for generating a local clock signal having a period equal to the number of free-running high frequency clock cycles T.

30. A device according to claim 29, wherein the second counter is initialized by data toggling in the received downstream bit serial signal.

31. A device according to claim 29, wherein the free-running high frequency clock signal is generated by an eight phase ring oscillator.

32. A device according to claim 29, wherein the first counter is enabled during a period of time when the downstream bit serial signal comprises a Sync byte and a PID byte of a USB Token Packet and Data Packet.

* * * * *